United States Patent
Park et al.

(10) Patent No.: US 7,787,540 B2
(45) Date of Patent: *Aug. 31, 2010

(54) METHOD FOR SCALABLY ENCODING AND DECODING VIDEO SIGNAL

(75) Inventors: Seung Wook Park, Seoul (KR); Ji Ho Park, Seoul (KR); Byeong Moon Jeon, Seoul (KR); Doe Hyun Yoon, Seoul (KR); Hyun Wook Park, Daejun-si (KR)

(73) Assignee: LG Electronics Inc., Seoul (KR)

( * ) Notice: Subject to any disclaimer, the term of this patent is extended or adjusted under 35 U.S.C. 154(b) by 1125 days.

This patent is subject to a terminal disclaimer.

(21) Appl. No.: 11/392,637

(22) Filed: Mar. 30, 2006

(65) Prior Publication Data

US 2006/0222068 A1 Oct. 5, 2006

Related U.S. Application Data

(60) Provisional application No. 60/667,115, filed on Apr. 1, 2005, provisional application No. 60/670,246, filed on Apr. 12, 2005, provisional application No. 60/670,241, filed on Apr. 12, 2005.

(30) Foreign Application Priority Data

Sep. 12, 2005 (KR) ............... 10-2005-0084729
Sep. 12, 2005 (KR) ............... 10-2005-0084742
Sep. 12, 2005 (KR) ............... 10-2005-0084744

(51) Int. Cl.
*H04N 7/12* (2006.01)
*H04N 11/02* (2006.01)
*H04N 11/04* (2006.01)
*H04B 1/66* (2006.01)

(52) U.S. Cl. .................................. 375/240.12
(58) Field of Classification Search ............... None
See application file for complete search history.

(56) References Cited

U.S. PATENT DOCUMENTS 5,650,824 A 7/1997 Huang (Continued)

FOREIGN PATENT DOCUMENTS

KR 10-1997-0064261 9/1997

(Continued)

OTHER PUBLICATIONS

Korean Notice of Allowance corresponding to Korean Application No. 2007-7025373 dated Dec. 23, 2008.

(Continued)

*Primary Examiner*—Nhon T Diep
(74) *Attorney, Agent, or Firm*—Harness, Dickey & Pierce, PLC

(57) ABSTRACT

In one embodiment, decoding of a video signal includes predicting at least a portion of a current image in a current layer based on at least a portion of a base image in a base layer and offset information. The offset information indicates an offset based on at least one pixel in the current image and a corresponding at least one pixel in the base image. For example, the offset information may represent a position offset between at least one sample in the current image and at least one sample in an up-sampled portion of the base image.

10 Claims, 5 Drawing Sheets

U.S. PATENT DOCUMENTS

| | | | |
|---|---|---|---|
| 5,712,687 A | 1/1998 | Naveen et al. | |
| 5,973,739 A | 10/1999 | Nilsson | |
| 5,995,150 A * | 11/1999 | Hsieh et al. | 375/240.12 |
| 6,057,884 A | 5/2000 | Chen et al. | |
| 6,510,177 B1 | 1/2003 | De Bonet et al. | |
| 6,535,559 B2 | 3/2003 | Yagasaki et al. | |
| 6,549,575 B1 | 4/2003 | Butter et al. | |
| 6,697,426 B1 | 2/2004 | Van Der Schaar et al. | |
| 6,728,317 B1 | 4/2004 | Demos | |
| 6,788,347 B1 | 9/2004 | Kim et al. | |
| 6,804,299 B2 | 10/2004 | Moni et al. | |
| 6,836,512 B2 | 12/2004 | Van Der Schaar et al. | |
| 6,847,685 B1 | 1/2005 | Fujiwara et al. | |
| 6,931,063 B2 | 8/2005 | Sun et al. | |
| 7,062,096 B2 | 6/2006 | Lin et al. | |
| 7,136,417 B2 * | 11/2006 | Rodriguez | 375/240.29 |
| 7,203,235 B2 | 4/2007 | Huang et al. | |
| 7,450,641 B2 | 11/2008 | Sun et al. | |
| 2004/0008790 A1 | 1/2004 | Rodriguez | |
| 2004/0114689 A1 | 6/2004 | Zhang et al. | |
| 2006/0126962 A1 | 6/2006 | Sun | |
| 2007/0086515 A1 | 4/2007 | Kirkenko et al. | |
| 2007/0116131 A1 | 5/2007 | Sun | |
| 2007/0140354 A1 | 6/2007 | Sun | |

FOREIGN PATENT DOCUMENTS

| | | |
|---|---|---|
| KR | 10-1999-0070553 | 9/1999 |
| KR | 10-2002-0064932 | 8/2002 |
| KR | 10-2003-0020382 | 3/2003 |
| KR | 10-2003-0089505 | 11/2003 |
| KR | 10-2004-0096548 | 11/2004 |
| KR | 10-2004-0107437 | 12/2004 |
| KR | 10-2005-0049644 | 5/2005 |
| TW | 200403941 | 3/2004 |
| WO | WO 03/047260 | 6/2003 |

OTHER PUBLICATIONS

Korean Notice of Allowance corresponding to Korean Application No. 2007-7025371 dated Dec. 23, 2008.
Korean Notice of Allowance corresponding to Korean Application No. 2007-7025370 dated Jan. 15, 2009.
Korean Notice of Allowance corresponding to Korean Application No. 2007-7025372 dated Jan. 16, 2009.
Taiwanese Office Action dated Apr. 19, 2009 with English translation.
United Stated Office Action dated Aug. 17, 2009.
United States Office Action dated Sep. 8, 2009.
Search Report for International Application No. PCT/KR2006/001200 dated Jun. 26, 2006.
Search Report for International Application No. PCT/KR2006/001339 dated Jun. 28, 2006.
Search Report for International Application No. PCT/KR2006/001341 dated Jul. 24, 2006.
Taiwanese Office Action dated Feb. 2, 2010 for corresponding Taiwanese Application No. 95111664.
United States Office Action dated Nov. 19, 2009.
United States Notice of Allowance dated Oct. 23, 2009.

* cited by examiner

METHOD FOR SCALABLY ENCODING AND DECODING VIDEO SIGNAL

DOMESTIC PRIORITY INFORMATION

This application also claims priority under 35 U.S.C. §119 on U.S. Provisional Application No. 60/667,115, filed on Apr. 1, 2005; U.S. Provisional Application No. 60/670,246, filed on Apr. 12, 2005, and U.S. Provisional Application No. 60/670,241, filed on Apr. 12, 2005, the entire contents of each of which are hereby incorporated by reference.

FOREIGN PRIORITY INFORMATION

This application claims priority under 35 U.S.C. §119 on Korean Patent Application No. 10-2005-0084744, filed on Sep. 12, 2005, Korean Patent Application No. 10-2005-0084742, filed on Sep. 12, 2005, and Korean Patent Application No. 10-2005-0084729, filed on Sep. 12, 2005, the entire contents of each of which are hereby incorporated by reference.

BACKGROUND OF THE INVENTION

1. Field of the Invention

The present invention relates to scalable encoding and decoding of a video signal.

2. Description of the Related Art

It is difficult to allocate high bandwidth, required for IV signals, to digital video signals wirelessly transmitted and received by mobile phones and notebook computers. It is expected that similar difficulties will occur with mobile TVs and handheld PCs, which will come into widespread use in the future. Thus, video compression standards for use with mobile devices should have high video signal compression efficiencies.

Such mobile devices have a variety of processing and presentation capabilities so that a variety of compressed video data forms should be prepared. This means that a variety of different quality video data with different combinations of a number of variables such as the number of frames transmitted per second, resolution, and the number of bits per pixel should be provided based on a single video source. This imposes a great burden on content providers.

Because of the above, content providers prepare high-bitrate compressed video data for each source video and perform, when receiving a request from a mobile device, a process of decoding compressed video and encoding it back into video data suited to the video processing capabilities of the mobile device. However, this method entails a transcoding procedure including decoding, scaling, and encoding processes, which causes some time delay in providing the requested data to the mobile device. The transcoding procedure also requires complex hardware and algorithms to cope with the wide variety of target encoding formats.

The Scalable Video Codec (SVC) has been developed in an attempt to overcome these problems. This scheme encodes video into a sequence of pictures with the highest image quality while ensuring that part of the encoded picture (frame) sequence (specifically, a partial sequence of frames intermittently selected from the total sequence of frames) can be decoded to produce a certain level of image quality.

Motion Compensated Temporal Filtering (MCTF) is an encoding scheme that has been suggested for use in the Scalable Video Codec. The MCTF scheme has a high compression efficiency (i.e., a high coding efficiency) for reducing the number of bits transmitted per second. The MCTF scheme is likely to be applied to transmission environments such as a mobile communication environment where bandwidth is limited.

Although it is ensured that part of a sequence of pictures encoded in the scalable MCTF coding scheme can be received and processed to video with a certain level of image quality as described above, there is still a problem in that the image quality is significantly reduced if the bitrate is lowered. One solution to this problem is to provide an auxiliary picture sequence for low bitrates, for example, a sequence of pictures that have a small screen size and/or a low frame rate.

The auxiliary picture sequence is referred to as a base layer (BL), and the main picture sequence is referred to as an enhanced or enhancement layer. Video signals of the base and enhanced layers have redundancy since the same video content is encoded into two layers with different spatial resolution or different frame rates. To increase the coding efficiency of the enhanced layer, a video signal of the enhanced layer may be predicted using motion information and/or texture information of the base layer. This prediction method is referred to as inter-layer prediction.

FIG. 1 illustrates examples of an intra BL prediction method and an inter-layer residual prediction method, which are inter-layer prediction methods for encoding the enhanced layer using the base layer.

The intra BL prediction method uses a texture (or image data) of the base layer. Specifically, the intra BL prediction method produces predictive data of a macroblock of the enhanced layer using a corresponding block of the base layer encoded in an intra mode. The term "corresponding block" refers to a block which is located in a base layer frame temporally coincident with a frame including the macroblock and which would have an area covering the macroblock if the base layer frame were enlarged by the ratio of the screen size of the enhanced layer to the screen size of the base layer. The intra BL prediction method uses the corresponding block of the base layer after enlarging the corresponding block by the ratio of the screen size of the enhanced layer to the screen size of the base layer through upsampling.

The inter-layer residual prediction method is similar to the intra BL prediction method except that it uses a corresponding block of the base layer encoded so as to contain residual data, which is data of an image difference, rather than a corresponding block of the base layer containing image data. The inter-layer residual prediction method produces predictive data of a macroblock of the enhanced layer encoded so as to contain residual data, which is data of an image difference, using a corresponding block of the base layer encoded so as to contain residual data. Similar to the intra BL prediction method, the inter-layer residual prediction method uses the corresponding block of the base layer containing residual data after enlarging the corresponding block by the ratio of the screen size of the enhanced layer to the screen size of the base layer through upsampling.

A base layer with lower resolution for use in the inter-layer prediction method is produced by downsampling a video source. Corresponding pictures (frames or blocks) in enhanced and base layers produced from the same video source may be out of phase since a variety of different downsampling techniques and downsampling ratios (i.e., horizontal and/or vertical size reduction ratios) may be employed.

FIG. 2 frustrates a phase relationship between enhanced and base layers. A base layer may be produced (i) by sampling a video source at lower spatial resolution separately from an enhanced layer or (ii) by downsampling an enhanced layer with higher spatial resolution. In the example of FIG. 2, the downsampling ratio between the enhanced and base layers is 2/3.

A video signal is managed as separate components, namely, a luma component and two chroma components. The luma component is associated with luminance information Y and the two chroma components are associated with chrominance information Cb and Cr. A ratio of 4:2:0 (Y:Cb:Cr) between luma and chroma signals is widely used. Samples of the chroma signal are typically located midway between samples of the luma signal. When an enhanced layer and/or a base layer are produced directly from a video source, luma and chroma signals of the enhanced layer and/or the base layer are sampled so as to satisfy the 4:2:0 ratio and a position condition according to the 4:2:0 ratio.

In the above case (i), the enhanced and base layers may be out of phase as shown in section (a) of FIG. 2 since the enhanced and base layers may have different sampling positions. In the example of section (a), luma and chroma signals of each of the enhanced and base layers satisfy the 4:2:0 ratio and a position condition according to the 4:2:0 ratio.

In the above case (ii), the base layer is produced by downsampling luma and chroma signals of the enhanced layer by a specific ratio. If the base layer is produced such that luma and chroma signals of the base layer are in phase with luma and chroma signals of the enhanced layer, the luma and chroma signals of the base layer do not satisfy a position condition according to the 4:2:0 ratio as illustrated in section (b) of FIG. 2.

In addition, if the base layer is produced such that luma and chroma signals of the base layer satisfy a position condition according to the 4:2:0 ratio, the chroma signal of the base layer is out of phase with the chroma signal of the enhanced layer as illustrated in section (c) of FIG. 2. In this case, if the chroma signal of the base layer is upsampled by a specific ratio according to the inter-layer prediction method, the upsampled chroma signal of the base layer is out of phase with the chroma signal of the enhanced layer.

Also in case (ii), the enhanced and base layers may be out of phase as illustrated in section (a).

That is, the phase of the base layer may be changed in the downsampling procedure for producing the base layer and in the upsampling procedure of the inter-layer prediction method, so that the base layer is out of phase with the enhanced layer, thereby reducing coding efficiency.

SUMMARY OF INVENTION

In one embodiment, decoding of a video signal includes predicting at least a portion of a current image in a current layer based on at least a portion of a base image in a base layer and offset information. The offset information indicates an offset based on at least one pixel in the current image and a corresponding at least one pixel in the base image. For example, the offset information may indicate a position offset between at least one sample in the current image and at least one sample in the up-sampled portion of the base image.

In one embodiment, the offset information indicates at least one of (i) a horizontal offset between at least one sample in the current image and at least one sample in the up-sampled portion of the base image, and (ii) a vertical offset between at least one sample in the current image and at least one sample in the up-sampled portion of the base image.

In an embodiment, the predicting step may obtain the offset information from a header of a slice in the base layer, and in another embodiment the offset information may be obtained from a sequence level header in the current layer.

Other related embodiments include methods of encoding a video signal, and apparatuses for encoding and decoding a video signal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF EXAMPLE EMBODIMENTS

Example embodiments of the present invention will now be described in detail with reference to the accompanying drawings.

Figure 1:
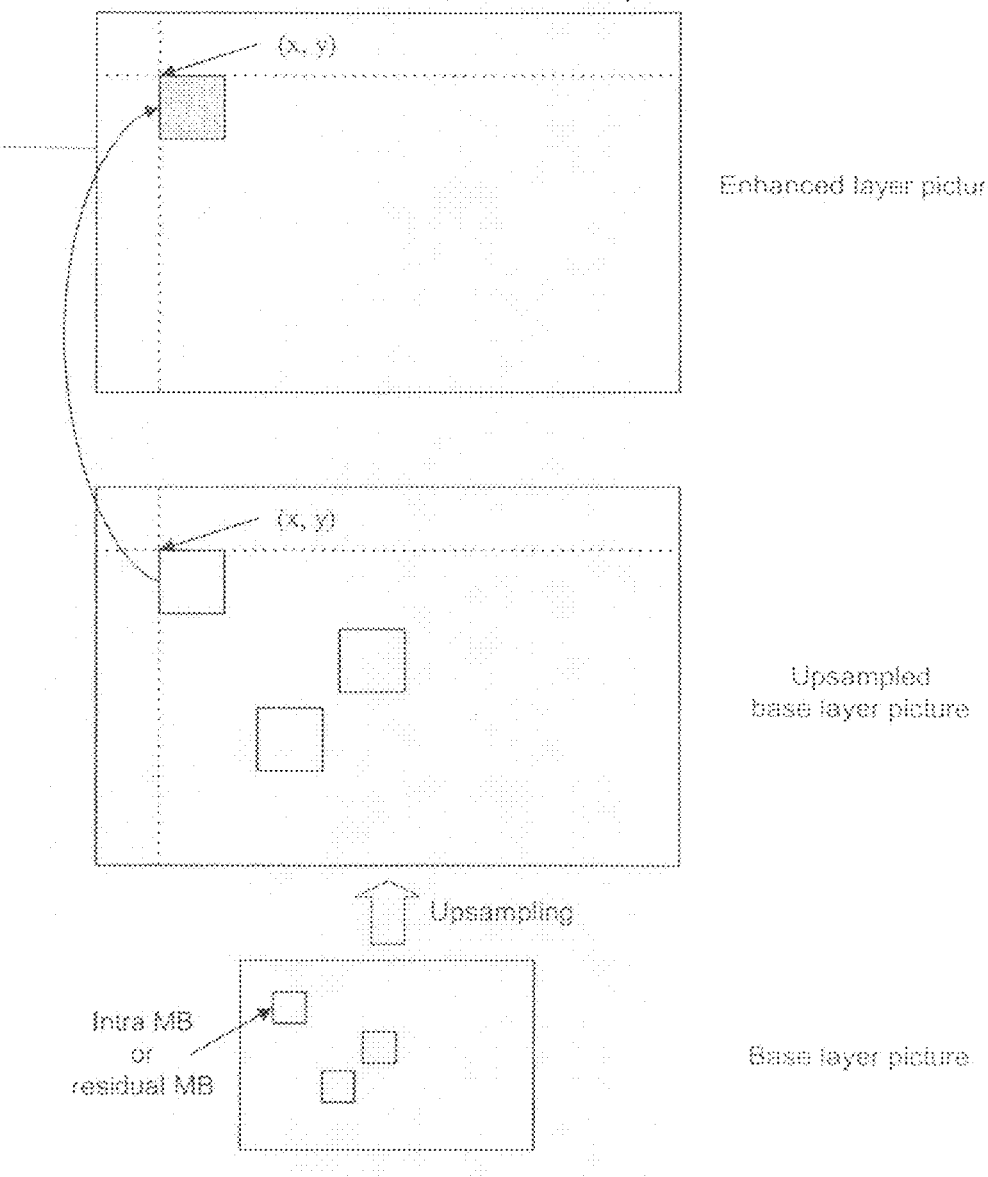
FIG. 1 illustrates an example of an inter-layer prediction method for encoding an enhanced layer using a base layer.
Figure 2:
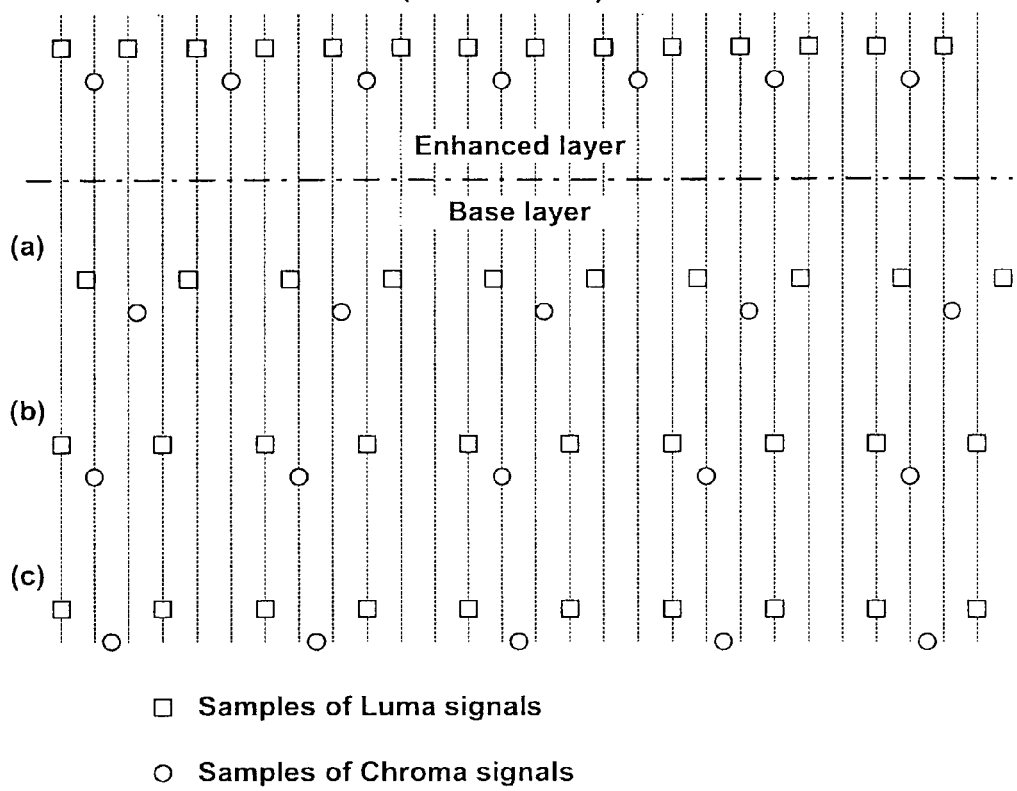
FIG. 2 illustrates examples of phase relationships between enhanced and base layers.
Figure 3:
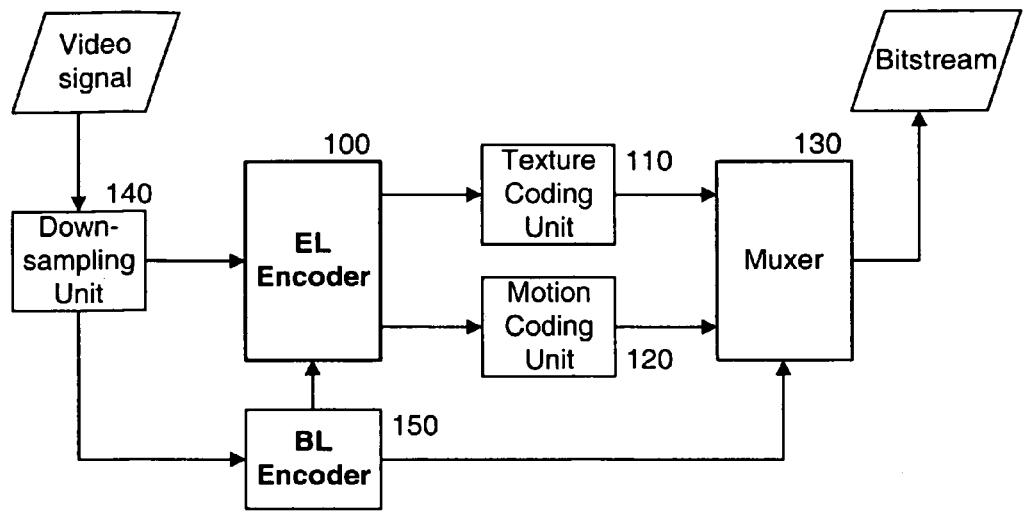
FIG. 3 is a block diagram of a video signal encoding apparatus to which a scalable video signal coding method according to the present invention may be applied.

FIG. 3 is a block diagram of a video signal encoding apparatus to which a scalable video signal coding method according to the present invention may be applied.

The video signal encoding apparatus shown in FIG. 3 comprises an enhanced layer (EL) encoder 100, a texture coding unit 110, a motion coding unit 120, a muxer (or multiplexer) 130, a downsampling unit 140, and a base layer (BL) encoder 150. The downsampling unit 140 produces an enhanced layer sigal directly from an input video signal or by downsampling the input video signal, and produces a base layer signal by downsampling the input video signal or the enhanced layer signal according to a specific scheme. The specific scheme will depend on the applications or devices receiving each layer; and therefore, is a matter of design choice. The EL encoder 100 encodes the enhanced layer signal generated by the downsampling unit 140 on a per macroblock basis in a scalable fashion according to a specified encoding scheme (for example, an MCTF scheme), and generates suitable management information. The texture coding unit 110 converts data of encoded macroblocks into a compressed bitstream. The motion coding unit 120 codes motion vectors of image blocks obtained by the EL encoder 100 into a compressed bitstream according to a specified scheme. The BL encoder 150 encodes the base layer signal generated by the downsampling unit 140 according to a specified scheme, for example, according to the MPEG-1, 2 or 4 standard or the H.261 or H.264 standard, and produces a small-screen picture sequence, for example, a sequence of pictures scaled down to 25% of their original size if needed. The muxer 130 encapsulates the output data of the text coding unit 110, the small-screen sequence from the BL encoder 150, and the output vector data of the motion coding unit 120 into a desired format. The muxer 130 multiplexes and outputs the encapsulated data into a desired transmission format.

The downsampling unit 140 not only transmits the enhanced and base layer signals to the EL and BL encoders 100 and 150, but also transmits sampling-related information of the two layers to the EL and BL encoders 100 and 150. The sampling-related information of the two layers may include spatial resolution (or screen sizes), frame rates, the ratios between luma and chroma signals of the two layers, the positions of chroma signals of the two layers, and information regarding a phase shift between luma and chroma signals of the two layers based on the respective positions of the luma and chroma signals of the two layers.

The phase shift can be defined as the phase difference between luma signals of the two layers. Typically, luma and chroma signals of the two layers are sampled so as to satisfy a position condition according to the ratio between the luma and chroma signals, and the luma signals of the two layers are sampled so as to be in phase with each other.

The phase shift can also be defined as the phase difference between chroma signals of the two layers. The phase difference between chroma signals of the two layers can be determined based on the difference between positions of the chroma signals of the two layers after the positions of the luma signals of the two layers are matched to each other so that the luma signals of the two layers are in phase with each other.

The phase shift can also be individually defined for each layer, for example, with reference to a single virtual layer (e.g., an upsampled base layer) based on the input video signal for generating the enhanced or base layer. Here, the phase difference is between luma and/or chroma samples (i.e., pixels) of the enhanced layer of the base layer and the virtual layer (e.g., an upsampled base layer).

The EL encoder 100 records the phase shift information transmitted from the downsampling unit 140 in a header area of a sequence layer or a slice layer. If the phase shift information has a value other than 0, the EL encoder 100 sets a global shift flag "global_shift_flag", which indicates whether or not there is a phase shift between the two layers, to, for example, "1", and records the value of the phase shift in information in fields "global_shift_x" and "global_shift_y". The "global_shift_x" value represents the horizontal phase shift. The "global_shift_y" value represents the vertical phase shift. Stated another way, the "global_shift_x" value represents the horizontal position offset between the samples (i.e., pixels), and the "global_shift_y" represents the vertical position offset between the samples (i.e., pixels).

On the other hand, if the phase shift information has a value of 0, the EL encoder 100 sets the flag "global_shift_flag" to, for example, "0", and does not record the values of the phase shift in the information fields "global_shift_x" and "global_shift_y".

The EL encoder 100 also records the sampling-related information in the header area of the sequence layer or the slice layer if needed.

The EL encoder 100 performs MCTF on the video data received from the down-sampling unit 140. Accordingly, the EL encoder 100 performs a prediction operation on each macroblock in a video flame (or picture) by subtracting a reference block, found by motion estimation, from the macroblock. Also, the EL encoder 100 selectively performs an update operation by adding an image difference between the reference block and the macroblock to the reference block.

Figure 4:
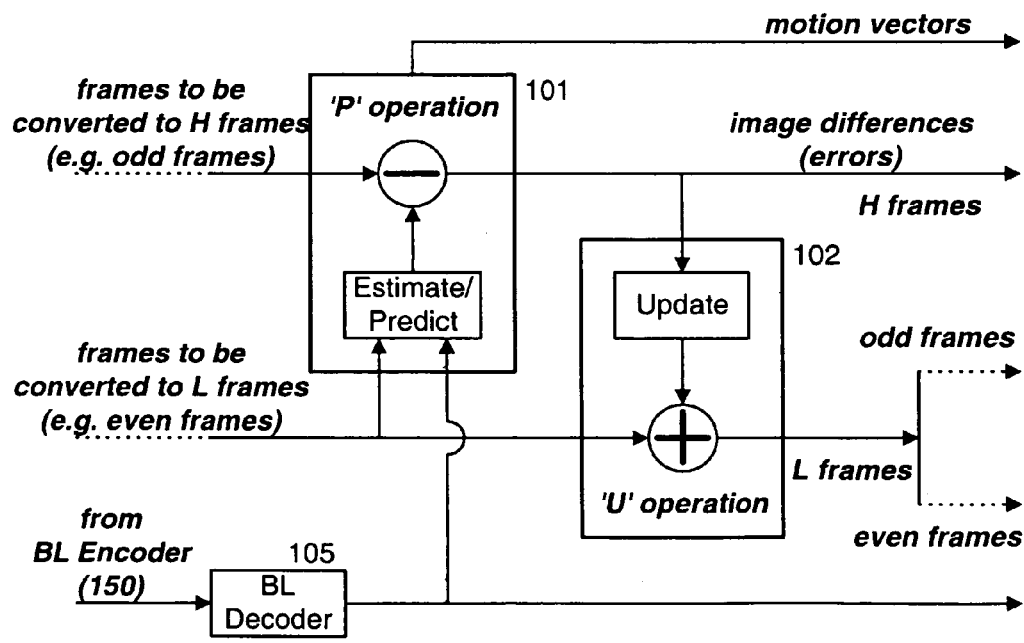
FIG. 4 illustrates elements of an EL encoder shown in FIG. 3.

The EL encoder 100 separates an input video flame sequence into, for example, odd and even frames. The EL encoder 100 performs prediction and update operations on the separated frames over a number of encoding levels, for example, until the number of L frames, which are produced by the update operation, is reduced to one for a group of pictures (GOP). FIG. 4 shows elements of the EL encoder 100 associated with prediction and update operations at one of the encoding levels.

The elements of the EL encoder 100 shown in FIG. 4 include an estimator/predictor 101. Through motion estimation, the estimator/predictor 101 searches for a reference block of each macroblock of a frame (for example, an odd frame in the enhanced layer), which is to contain residual data, and then performs a prediction operation to calculate an image difference (i.e., a pixel-to-pixel difference) of the macroblock from the reference block and a motion vector form the macroblock to the reference block. The EL encoder 100 may further include an updater 102 for performing an update operation on a frame (for example, an even frame) including the reference block of the macroblock by normalizing the calculated image difference of the macroblock from the reference block and adding the normalized value to the reference block.

A block having the smallest image difference from a target block has the highest correlation with the target block. The image difference of two blocks is defined, for example, as the sum or average of pixel-to-pixel differences of the two blocks. Of blocks having a threshold pixel-to-pixel difference sum (or average) or less from the target block, a block(s) having the smallest difference sum (or average) is referred to as a reference block(s).

The operation carried out by the estimator/predictor 101 is referred to as a 'P' operation, and a frame produced by the 'P' operation is referred to as an 'H' frame. The residual data present in the 'H' frame reflects high frequency components of the video signal. The operation carried out by the updater 102 is referred to as a 'U' operation, and a frame produced by the 'U' operation is referred to as an 'L' frame. The 'L' frame is a low-pass subband picture.

The estimator/predictor 101 and the updater 102 of FIG. 4 may perform their operations on a plurality of slices, which are produced by dividing a single frame, simultaneously and in parallel, instead of performing their operations in units of frames. In the following description of the embodiments, the term 'frame' is used in a broad sense to include a 'slice', provided that replacement of the term 'frame' with the term 'slice' is technically equivalent.

More specifically, the estimator/predictor 101 divides each input video frame or each odd one of the L frames obtained at the previous level into macroblocks of a size. The estimator/predictor 101 then searches for a block, whose image is most certain similar to that of each divided macroblock, in the current odd frame or in even frames prior to and subsequent to the current odd frame at the same temporal decomposition level, and produces a predictive image of each divided macroblock using the most similar or reference block and obtains a motion vector thereof.

As shown in FIG. 4, the EL encoder 100 may also include a BL decoder 105. The BL decoder 105 extracts encoding information such as a macroblock mode from an encoded base layer stream containing a small-screen sequence received from the BL encoder 150, and decodes the encoded base layer stream to produce frames, each composed of one or more macroblocks. The estimator/predictor 101 can also search for a reference block of the macroblock in a frame of the base layer according to the intra BL prediction method. Specifically, the estimator/predictor 101 searches for a corresponding block encoded in an intra mode in a frame of the base layer reconstructed by the BL decoder 105, which is temporally coincident with the frame including the macroblock. The term "corresponding block" refers to a block which is located in the temporally coincident base layer frame and which would have an area covering the macroblock if the base layer frame were enlarged by the ratio of the screen size of the enhanced layer to the screen size of the base layer.

The estimator/predictor 101 reconstructs an original image of the found corresponding block by decoding the intra-coded pixel values of the corresponding block, and then upsamples the found corresponding block to enlarge it by the ratio of the screen size of the enhanced layer to the screen size of the base layer. The estimator/predictor 101 performs this upsampling taking into account the phase shift information "global_shift_x/y" transmitted from the downsampling unit 140 so that the enlarged corresponding block of the base layer is in phase with the macroblock of the enhanced layer.

The estimator/predictor 101 encodes the macroblock with reference to a corresponding area in the corresponding block of the base layer, which has been enlarged so as to be in phase with the macroblock. Here, the term "corresponding area" refers to a partial area in the corresponding block which is at the same relative position in the frame as the macroblock.

If needed, the estimator/predictor 101 searches for a reference area more highly correlated with the macroblock in the enlarged corresponding block of the base layer by performing motion estimation on the macroblock while changing the phase of the corresponding block, and encodes the macroblock using the found reference area.

If the phase of the enlarged corresponding block is further changed while the reference area is searched for, the estimator/predictor 101 sets a local shift flag "local_shift_flag", which indicates whether or not there is a phase shift, different from the global phase shift "global_shift_x/y", between the macroblock and the corresponding upsampled block, to, for example, "1". Also, the estimator/predictor 101 records the local shift flag in a header area of the macroblock and records the local phase shift between the macroblock and the corresponding block in information fields "local_shift_x" and "local_shift_y". The local phase shift information may be replacement information, and provide the entire phase shift information as a replacement or substitute for the global phase shift information. Alternatively, the local phase shift information may be additive information, wherein the local phase shift information added to the corresponding global phase shift information provides the entire or total phase shift information.

The estimator/predictor 101 further insets information indicating that the macroblock of the enhanced layer has been encoded in an intra BL mode in the header area of the macroblock so as to inform the decoder of the same.

The estimator/predictor 101 can also apply the inter-layer residual prediction method to a macroblock to contain residual data, which is data of an image difference, using a reference block found in other frames prior to and subsequent to the macroblock. Also in this case, the estimator/predictor 101 upsamples a corresponding block of the base layer encoded so as to contain residual data, which is data of an image difference, taking into account the phase shift information "global_shift_x/y" transmitted from the downsampling unit 140 so that the base layer is in phase with the enhanced layer. Here, the corresponding block of the base layer is a block which has been encoded so as to contain residual data, which is data of an image difference.

The estimator/predictor 101 inserts information indicating that the macroblock of the enhanced layer has been encoded according to the inter-layer residual prediction method in the header area of the macroblock so as to inform the decoder of the same.

The estimator/predictor 101 performs the above procedure for all macroblocks in the frame to complete an H frame which is a predictive image of the frame. The estimator/predictor 101 performs the above procedure for all input video frames or all odd ones of the L frames obtained at the previous level to complete H frames which are predictive images of the input frames.

As described above, the updater 102 adds an image difference of each macroblock in an H frame produced by the estimator/predictor 101 to an L frame having its reference block, which is an input video flame or an even one of the L frames obtained at the previous level.

The data stream encoded in the method described above is transmitted by wire or wirelessly to a decoding apparatus or is delivered via recording media. The decoding apparatus reconstructs the original video signal according to the method described below.

Figure 5:
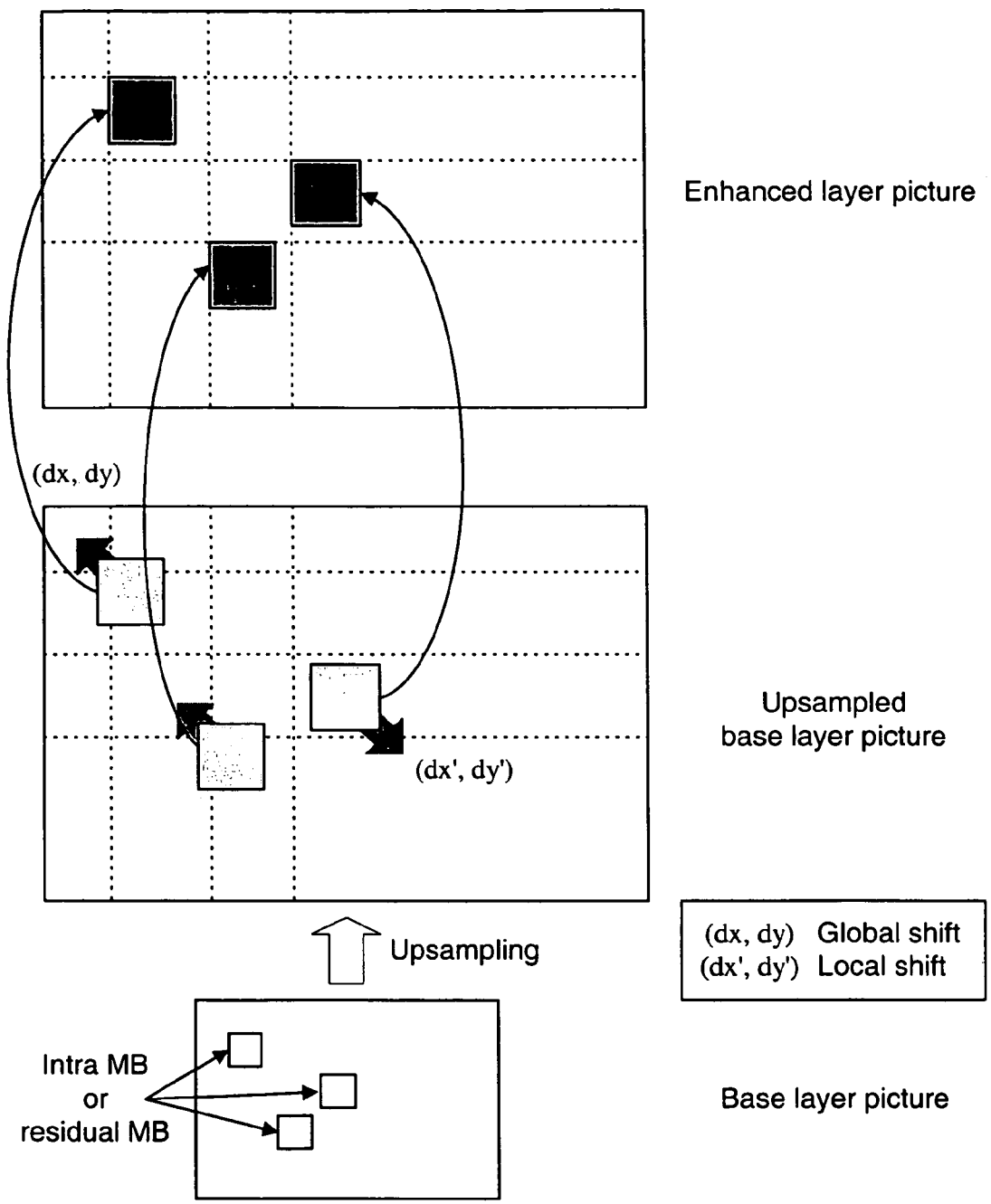
FIG. 5 illustrates a method for upsampling a base layer for use in decoding an enhanced layer, encoded according to an inter-layer prediction method, taking into account a phase shift in the base layer and/or the enhanced layer, according to an embodiment of the present invention.

FIG. 5 illustrates a method for upsampling a base layer for use in decoding an enhanced layer, encoded according to the inter-layer prediction method, taking into account a phase shift in the base layer and/or the enhanced layer, according to an embodiment of the present invention.

In order to decode a macroblock of the enhanced layer encoded according to the inter-layer prediction method, a block of the base layer corresponding to the macroblock is enlarged by the ratio of the screen size of the enhanced layer to the screen size of the base layer through upsampling. This upsampling is performed taking into account phase shift information "global_shift_x/y" in the enhanced layer and/or the base layer, so as to compensate for a global phase shift between the macroblock of the enhanced layer and the enlarged corresponding block of the base layer.

If there is a local phase shift "local_shift_x/y", different from the global phase shift "global_shift_x/y", between the macroblock of the enhanced layer and the corresponding block of the base layer, the corresponding block is upsampled taking into account the local phase shift "local_shift_x/y". For example, the local phase shift information may be used instead of the global phase shift information in one embodiment, or alternatively, in addition to the global phase shift information in another embodiment.

Then, an original image of the macroblock of the enhanced layer is reconstructed using the corresponding block which has been enlarged so as to be in phase with the macroblock.

Figure 6:
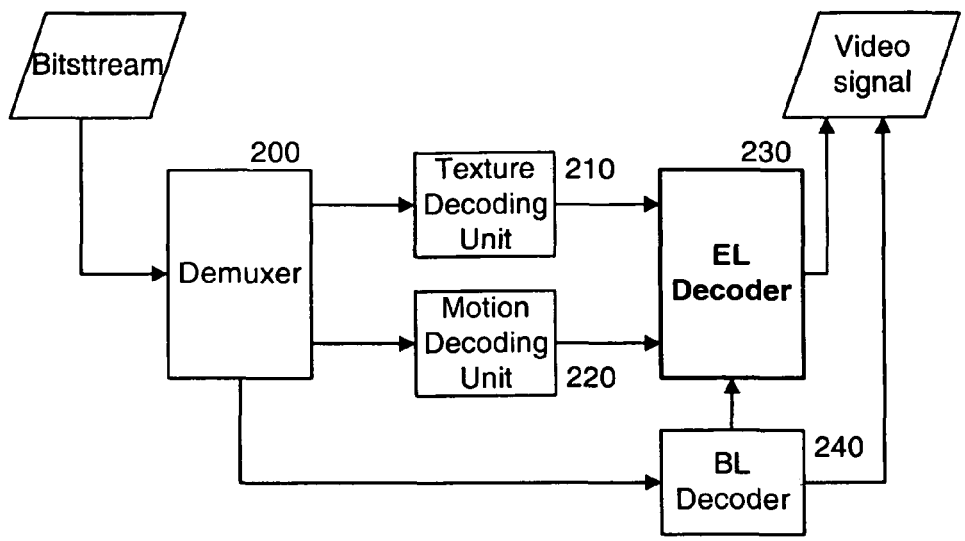
FIG. 6 is a block diagram of an apparatus for decoding a bit stream encoded by the apparatus of FIG. 3.

FIG. 6 is a block diagram of an apparatus for decoding a bit stream encoded by the apparatus of FIG. 3. The decoding apparatus of FIG. 6 includes a demuxer (or demultiplexer) 200, a texture decoding unit 210, a motion decoding unit 220, an EL decoder 230, and a BL decoder 240. The demuxer 200 separates a received bit stream into a compressed motion vector stream and a compressed macroblock information stream. The texture decoding unit 210 reconstructs the compressed macroblock information stream to its original uncompressed state. The motion decoding unit 220 reconstructs the compressed motion vector stream to its original uncompressed state. The EL decoder 230 converts the uncompressed macroblock information stream and the uncompressed motion vector stream back to an original video sigal according to a specified scheme (for example, an MCTF scheme). The BL decoder 240 decodes a base layer stream according to a specified scheme (for example, the MPEG4 or H.264 standard).

The EL decoder 230 uses encoding information of the base layer and/or a decoded frame or macroblock of the base layer in order to decode an enhanced layer stream according to the inter-layer prediction method. To accomplish this, the EL decoder 230 reads a global shift flag "global_shift_flag" and phase shift information "global_shift_x/y" from a sequence header area or a slice header area of the enhanced layer to determine whether or not there is a phase shift in the enhanced layer and/or the base layer and to confirm the phase shift. The EL decoder 230 upsamples the base layer taking into account the confirmed phase shift so that the base layer to be used for the inter-layer prediction method is in phase with the enhanced layer.

Figure 7:
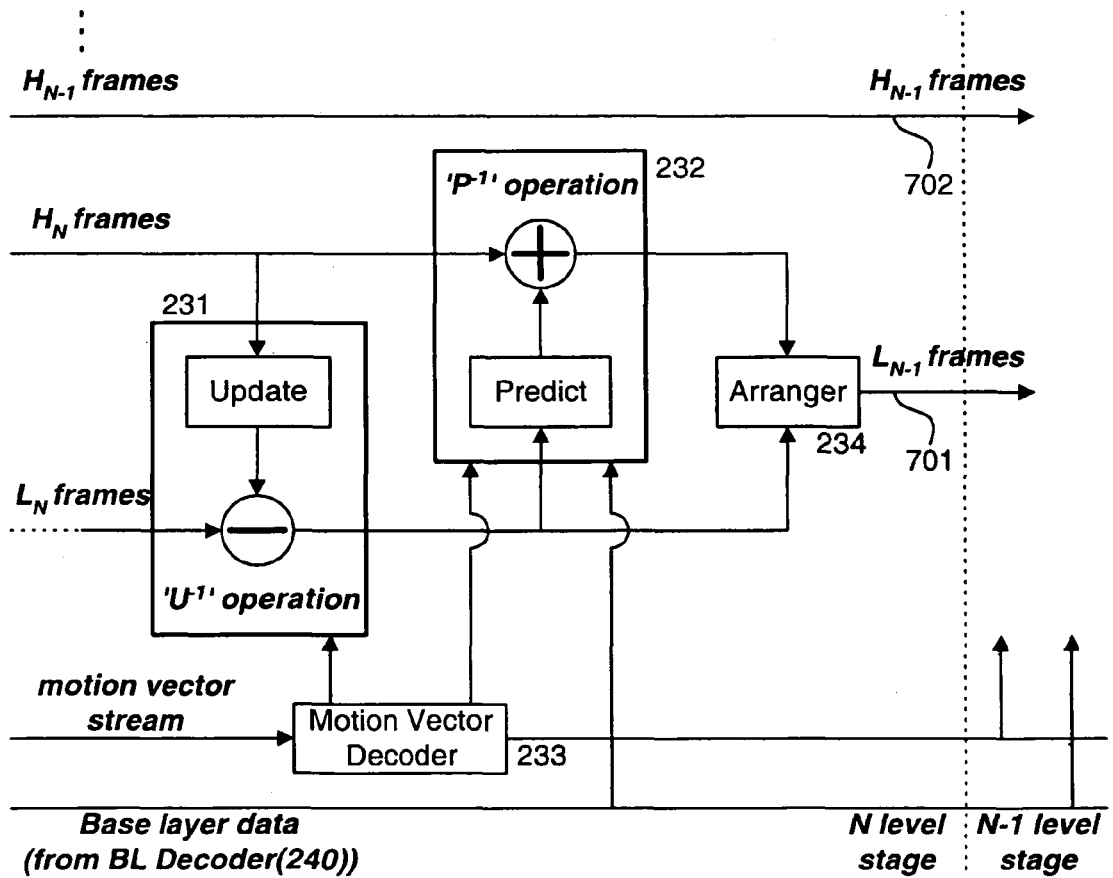
FIG. 7 illustrates elements of an EL decoder shown in FIG. 6.

The EL decoder 230 reconstructs an input stream to an original frame sequence. FIG. 7 illustrates main elements of an EL decoder 230 which is implemented according to the MCTF scheme.

The elements of the EL decoder 230 of FIG. 7 perform temporal composition of H and L frame sequences of temporal decomposition level N into an L frame sequence of temporal decomposition level N−1. The elements of FIG. 7 include an inverse updater 231, an inverse predictor 232, a motion vector decoder 233, and an arranger 234. The inverse updater 231 selectively subtracts difference values of pixels of input H frames from corresponding pixel values of input L frames. The inverse predictor 232 reconstructs input H frames into L frames of original images using both the H flames and the above L frames, from which the image differences of the H frames have been subtracted. The motion vector decoder 233 decodes an input motion vector stream into motion vector information of blocks in H frames and provides the motion vector information to an inverse updater 231 and an inverse predictor 232 of each stage. The arranger 234 interleaves the L frames completed by the inverse predictor 232 between the L frames output from the inverse updater 231, thereby producing a normal L frame sequence.

The L frames output from the arranger 234 constitute an L frame sequence 701 of level N−1. A next-stage inverse updater and predictor of level N−1 reconstructs the L frame sequence 701 and an input H frame sequence 702 of level N−1 to an L frame sequence. This decoding process is performed over the same number of levels as the number of encoding levels performed in the encoding procedure, thereby reconstructing an original video frame sequence.

A reconstruction (temporal composition) procedure at level N, in which received H lames of level N and L frames of level N produced at level N+1 are reconstructed to L lames of level N−1, will now be described in more detail.

For an input L frame of level N, the inverse updater 231 determines all corresponding H frames of level N, whose image differences have been obtained using, as reference blocks, blocks in an original L frame of level N−1 updated to the input L frame of level N at the encoding procedure, with reference to motion vectors provided from the motion vector decoder 233. The inverse updater 231 then subtracts error values of macroblocks in the corresponding H frames of level N from pixel values of corresponding blocks in the input L frame of level N, thereby reconstructing an original L frame.

Such an inverse update operation is performed for blocks in the current L frame of level N, which have been updated using error values of macroblocks in H frames in the encoding procedure, thereby reconstructing the L frame of level N to an L frame of level N−1.

For a target macroblock in an input H frame, the inverse predictor 232 determines its reference blocks in inverse-updated L frames output from the inverse updater 231 with reference to motion vectors provided from the motion vector decoder 233, and adds pixel values of the reference blocks to difference (error) values of pixels of the target macroblock, thereby reconstructing its original image.

If information indicating that a macroblock in an H frame has been encoded in an intra BL mode is included in a header area of the macroblock, the inverse predictor 232 reconstructs an original image of the macroblock using a base layer frame provided from the BL decoder 240. The following is a detailed example of this process.

The inverse predictor 232 reconstructs an original image of an intra-coded block in the base layer, which corresponds to the macroblock in the enhanced layer, and upsamples the reconstructed corresponding block from the base layer to enlarge it by the ratio of the screen size of the enhanced layer to the screen size of the base layer. The inverse predictor 232 performs this upsampling taking into account phase shift information "global_shift_x/y" in the enhanced layer and/or the base layer so that the enlarged corresponding block of the base layer is in phase with the macroblock of the enhanced layer. Namely, if the "global_shift_flag" indicates a phase shift exists between the base layer and the enhanced layer (e.g., equals 1), then the inverse predictor 232 phase shifts the corresponding macroblock from the base layer during upsampling by the "global_shift_x" and "global_shift_y" values. The inverse predictor 232 reconstructs an original image of the macroblock by adding pixel values of a corresponding area in the enlarged corresponding block of the base layer, which has been enlarged so as to be in phase with the macroblock, to the difference values of pixels of the macroblock. Here, the term "corresponding area" refers to a partial area in the corresponding block which is at the same relative position in the frame as the macroblock.

If a local shift flag "local_shift_flag" indicates that there is a local phase shift "local_shift_x/y" different from the global phase shift "global_shift_x/y" between the macroblock and the corresponding block, the inverse predictor 232 upsamples the corresponding block taking into account the local phase shift "local_shift_x/y" (as substitute or additional phase shift information). The local phase shift information may be included in the header area of the macroblock.

If information indicating that a macroblock in an H frame has been encoded in an inter-layer residual mode is included in a header area of the macroblock, the inverse predictor 232 upsamples a corresponding block of the base layer encoded so as to contain residual data, taking into account the global phase shift "global_shift_x/y" as discussed above to enlarge the corresponding block so as to be in phase with the macroblock of the enhanced layer. The inverse predictor 232 then reconstructs residual data of the macroblock using the corresponding block enlarged so as to be in phase with the macroblock.

The inverse predictor 232 searches for a reference block of the reconstructed macroblock containing residual data in an L frame with reference to a motion vector provided from the motion vector decoder 233, and reconstructs an original image of the macroblock by adding pixel values of the reference block to difference values of pixels (i.e., residual data) of the macroblock.

All macroblocks in the current H frame are reconstructed to their original images in the same manner as the above operation, and the reconstructed macroblocks are combined to reconstruct the current H frame to an L frame. The arranger 234 alternately arranges L frames reconstructed by the inverse predictor 232 and L frames updated by the inverse updater 231, and outputs such arranged L frames to the next stage.

The above decoding method reconstructs an MCTF-encoded data stream to a complete video frame sequence. In the case where the prediction and update operations have been performed for a group of pictures (GOP) N times in the MCTF encoding procedure described above, a video frame sequence with the original image quality is obtained if the inverse update and prediction operations are performed N times in the MCTF decoding procedure. However, a video frame sequence with a lower image quality and at a lower bitrate may be obtained if the inverse update and prediction operations are performed less than N times. Accordingly the decoding apparatus is designed to perform inverse update and prediction operations to the extent suitable for the performance thereof.

The decoding apparatus described above can be incorporated into a mobile communication terminal, a media player, or the like.

As is apparent from the above description, a method for encoding and decoding a video signal according to the present invention increases coding efficiency by preventing a phase shift in a base layer and/or an enhanced layer caused in downsampling and upsampling procedures when encoding/decoding the video signal according to an inter-layer prediction method.

Although the example embodiments of the present invention have been disclosed for illustrative purposes, those skilled in the art will appreciate that various improvements, modifications, substitutions, and additions are possible, without departing from the scope and spirit of the invention.

What is claimed is:

1. A method for decoding a video signal, comprising:
   obtaining position information of a current block of a current image in an enhanced layer;
   obtaining offset information between at least one sample of a reference image and at least one sample of the current image, the reference image representing an up-sampled portion of an image in a base layer;
   determining whether a position of the current block is included in the reference image, based on the position information of the current block and the offset information; and
   decoding the current block based on the determining step.

2. The method of claim 1, wherein the enhanced layer differs from the base layer in a screen ratio or a spatial resolution.

3. The method of claim 1, further comprising:
   predicting a portion of the current image based on at least part of an up-sampled portion of the base layer image and the offset information,
   wherein the current block is decoded by using the predicted portion of the current image.

4. The method of claim 1, wherein the offset information includes a position offset between at least one sample in the current image and at least one sample in the reference image.

5. The method of claim 4, wherein the offset information includes a horizontal offset between at least one sample in the current image and at least one sample in the reference image.

6. The method of claim 4, wherein the offset information includes a vertical offset between at least one sample in the current image and at least one sample in the reference image.

7. The method of claim 1, further comprising:
   upsampling at least a portion of the base layer image to obtain the reference image.

8. The method of claim 1, wherein the offset information is obtained from a sequence parameter set in the enhanced layer.

9. The method of claim 1, wherein the offset information is obtained from a slice header in the enhanced layer.

10. An apparatus for decoding a video signal, comprising:
    a demuxer obtaining position information of a current block of a current image in an enhanced layer, and offset information between at least one sample of a reference image and at least one sample of a current image, the reference image representing an up-sampled portion of an image in a base layer; and
    a decoder decoding the current block when being determined that a position of the current block is included in the reference image, based on the position information of the current block and the offset information.

* * * * *